United States Patent [19]
Gordon et al.

[11] Patent Number: 5,855,835
[45] Date of Patent: Jan. 5, 1999

[54] METHOD AND APPARATUS FOR LASER ABLATING A NOZZLE MEMBER

[76] Inventors: Gregory Gary Gordon, 2525 SE. Thompson St., Corvallis, Oreg. 97330; Peter S. Nyholm, 6008 Bon Terra Dr., Austin, Tex. 78731; John G. Liebeskind, 4775 NW. Elmwood Dr., Corvallis, Oreg. 97330; William D. Bangs, 31770 Mcloughlin Dr., Philomath, Oreg. 97370

[21] Appl. No.: 713,580

[22] Filed: Sep. 13, 1996

[51] Int. Cl.⁶ ................................................. B23K 26/18
[52] U.S. Cl. .......................... 264/400; 264/482; 425/174.4
[58] Field of Search .................................. 264/400, 482; 219/121.68, 121.75, 121.69; 428/174-4

[56] References Cited

U.S. PATENT DOCUMENTS

| | | | |
|---|---|---|---|
| 4,851,661 | 7/1989 | Sorkoram | 264/400 |
| 5,223,157 | 6/1993 | Schreiber et al. | 219/121.68 |
| 5,227,098 | 7/1993 | Philby et al. | |
| 5,291,226 | 3/1994 | Schantz et al. | 346/140 R |
| 5,296,673 | 3/1994 | Smith | 219/121.68 |
| 5,378,137 | 1/1995 | Asakawa et al. | 425/174.4 |
| 5,417,897 | 5/1995 | Asakawa et al. | |

*Primary Examiner*—Mathieu D. Vargot
*Attorney, Agent, or Firm*—Kevin B. Sullivan

[57] ABSTRACT

The present invention is an apparatus for forming nozzles in a nozzle member for a printhead. The apparatus includes a radiation source for forming nozzles of a selected shape in the nozzle member. Also included is a support layer positioned proximate the nozzle member opposite the radiation source. The support layer is formed of a material that is selected to limit energy transfer from the support layer to prevent damage to the nozzle member.

14 Claims, 3 Drawing Sheets

METHOD AND APPARATUS FOR LASER ABLATING A NOZZLE MEMBER

BACKGROUND OF THE INVENTION

The present invention relates to ink jet printers and, more particularly, to the formation of nozzles in a printhead nozzle member for use with an ink jet printer.

Thermal ink jet printers operate by rapidly heating a small volume of ink and causing the ink to vaporize, thereby ejecting a droplet of ink through an orifice to strike a recording medium, such as a sheet of paper. When a number of orifices are arranged in a pattern, the properly sequenced ejection of ink from each orifice causes characters or other images to be printed upon the recording media as the printhead is moved relative to the recording medium.

In these printers, print quality depends upon the physical characteristics of the orifices, or nozzles, in the printhead. For example, the geometry of the nozzles affects the size, shape, trajectory, and speed of the ink drop ejected. Therefore, it is critical that the nozzles formed have the proper taper and that the nozzles are uniform both on the same printhead and from printhead to printhead.

U.S. Pat. No. 5,291,226 to Schantz et al, assigned to the assignee of the present invention, is incorporated herein by reference describes a method for forming tapered ink jet nozzles using a laser ablation technique. A Tape Automated Bonding (TAB) technique is used to form the printheads in long strips of film or tapes which extend between a pair of reels. Sprocket holes are formed in the tape to accurately transport and position the tape beneath a radiation source which is used to form the nozzle members. A metal support layer is positioned adjacent the nozzle member opposite a radiation source such as an excimer laser. The radiation source then provides a selected amount of energy for a selected time period in a selected location to ablate through the nozzle member thereby forming a properly tapered nozzle. A vacuum hole is located in the metal support layer beneath the nozzles is used to remove debris during ablation.

A problem associated with this technique is that the nozzle is not ablated uniformly. As a result a portion of the debris that is to be ablated remains partially attached to the nozzle member and is pulled toward the support member by the vacuum. This partially attached portion of debris referred to as a "trapdoor" remains attached to the nozzle member and is not removed by the ablation process. This debris or trapdoors must be removed in an additional manufacturing step adding to the production cost of the printhead.

In an attempt to prevent trap door formation the vacuum holes beneath the nozzles were eliminated. A problem with eliminating vacuum holes has been damage to the nozzle member in the region proximate the nozzle. Applicants believe that this damage to the nozzle member is due to one of the following mechanisms. The first of these mechanisms is that the support layer reflects some of the energy which is incident on the support layer toward the nozzle member which increases the amount of energy being provided to the nozzle member. This increase in energy provided to the nozzle member results in ablation of additional portions of the nozzle member. Ablation of the nozzle member resulting from reflections from the support layer surface tends to result in poorly defined orifice tapers as well as the ablation of the orifice surface adjacent the support layer or support member. Nozzle members having poorly formed tapers as well as ablated surfaces adjacent the taper form poor quality images on print media.

A second mechanism which can account for the observed damage to the nozzle member is that localized heating of the support layer due to absorption of incident energy from the radiation source which produces conductive heating of the orifice layer. If this conductive heating of the orifice layer is sufficient to heat the orifice layer to a glass transition temperature deformation of the orifice layer adjacent the support layer can occur.

Another problem is that the heating of the support layer surface results in conductive heating of the nozzle member which produces thermal expansions which alters nozzle spacing. Because the heating of the support layer is very localized and for short time durations it is difficult to provide cooling to maintain a support layer temperature that is both uniform sufficiently low to prevent thermal expansion which can alter nozzle spacing or damage to the nozzle member or nozzle member films.

There is an ever present need for techniques for forming tapered nozzles in polymer based nozzle members. These techniques should allow for the reliable formation of properly tapered nozzles with little or no defect. In addition, this technique should allow the nozzle members formed to have a high degree of consistency thereby producing a more uniform and consistent drop size from orifice member to orifice member. Finally, this technique should be well suited to a manufacturing environment to reduce the cost and complexity of the manufacturing process.

SUMMARY OF THE INVENTION

The present invention is an apparatus for forming nozzles in a nozzle member for a printhead. The apparatus includes a radiation source for forming nozzles of a selected shape in the nozzle member. Also included is a support layer positioned proximate the nozzle member opposite the radiation source. The support layer is formed of a material that is selected to limit energy transfer from the support layer to prevent damage to the nozzle member.

In one embodiment the support layer is formed from a material that is selected to limit reflected radiation from the support layer to less than the ablation threshold thereby preventing unwanted ablation of the nozzle member. In one preferred embodiment the support layer is made from a material that reflects less than 10 percent of the incident energy. In this preferred embodiment the support layer is made from fused silica.

In an alternative embodiment the support layer is formed from a material that is selected to have a thermal diffusivity that is sufficient to limit conductive heating of the nozzle member to less than a glass transition temperature of the nozzle member.

DETAILED DESCRIPTION OF THE PREFERRED EMBODIMENT

Figure 1:
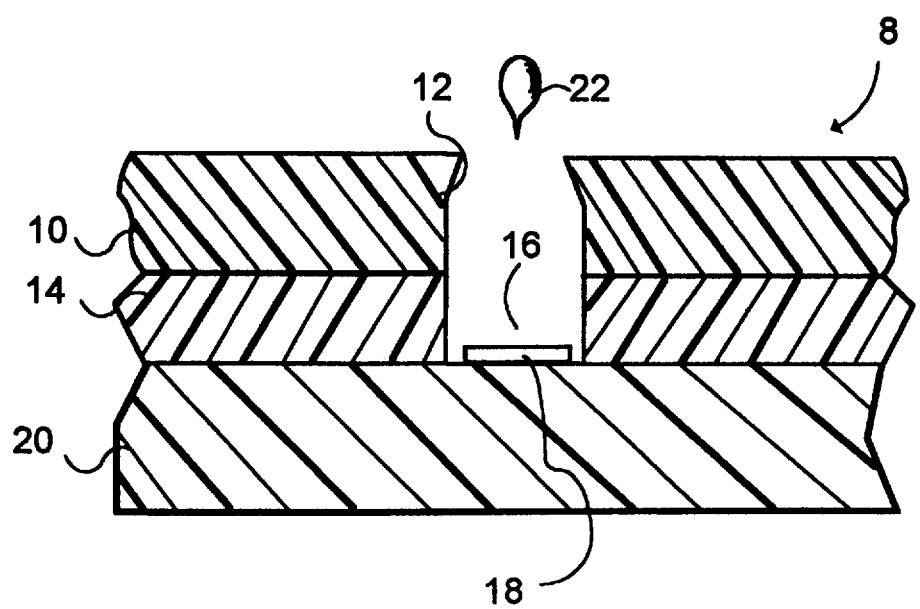
FIG. 1 is a cross section of a printhead for a thermal ink jet printer incorporating a nozzle member having tapered nozzles.

FIG. 1 is a cross section of a desirable type of thermal ink jet printhead 8. The printhead 8 is a schematic representation which is not drawn to scale. Printhead 8 includes a nozzle member 10, having a tapered nozzle 12. Affixed to the back surface of the nozzle member 10 is a barrier layer 14, which channels liquid ink into a vaporization chamber 16. Liquid ink within the vaporization chamber 16 is vaporized by the energization of a thin film resistor 18 formed on the surface of a semiconductor substrate 20, which produces a droplet of ink 22 to be injected from nozzle 12.

Preferably, nozzle member 10 is formed of a polymer material, and nozzle 12 is formed in a nozzle member 10 using an ablation technique of the present invention. Nozzle member 10 can also be formed of a photo resist material, where nozzle 12 is formed using photolithographic techniques or other conventional techniques.

Tapered nozzles have been many advantages over straight bore nozzles. A tapered nozzle increases the velocity of an ejected ink droplet. Also, the wider bottom opening in the nozzle member 10 allows for a greater alignment tolerance between the nozzle member 10 and the thin film resistor 18, without affecting the quality of print. Additionally, a smaller ink droplet is ejected, enabling more precise printing.

Ablation is well known to produce features with tapered walls, tapered so that the diameter of an orifice is larger at the surface unto which the laser is incident, and smaller at the exit surface. The taper angle varies significantly with variation in the optical energy density incident on the nozzle member for energy density less than about 2 joules per square centimeter. If the energy density were uncontrolled, the orifices produced would vary significantly in taper angle, resulting in substantial variation in exit orifice diameter. Such variation would produce deleterious variations in the ejected ink drop volume and velocity, reducing print quality. In the preferred embodiment, the optical energy of the ablating laser beam is precisely monitored and controlled to achieve a consistent taper angle, and thereby a reproducible exit diameter. In addition, the print quality benefits resulting from the consistent orifice exit diameter, a taper is beneficial to the operation of the orifices, since the taper acts to increase the discharge speed and provide a more focused ejection of ink, as well as provide other advantages. The taper may be in the range of 5 to 30 degrees relative to the axis of the orifice.

Laser ablation makes use of short pulses of intense ultraviolet light which are absorbed in a thin surface layer of material about 1 micrometer or less on the surface. Preferred pulse energies are greater than about 100 millijoules per square centimeter and pulse durations are shorter than about 1 microsecond. Under these conditions, the intense ultraviolet light breaks down the material structure by various mechanisms, including photo disassociation of the chemical bonds of the material. Furthermore, the absorbed ultraviolet energy is concentrated in a small volume of material that it rapidly heats the disassociated fragments and ejects them away from the surface of the material. Because the absorption depth is small the heat affected zone is minimized. As a result, the surrounding region is not melted or other wise damaged, and the perimeter of the ablated feature can replicate to shape of the incident optical beam with precision on the scale of about 1 micrometer.

Figure 2:
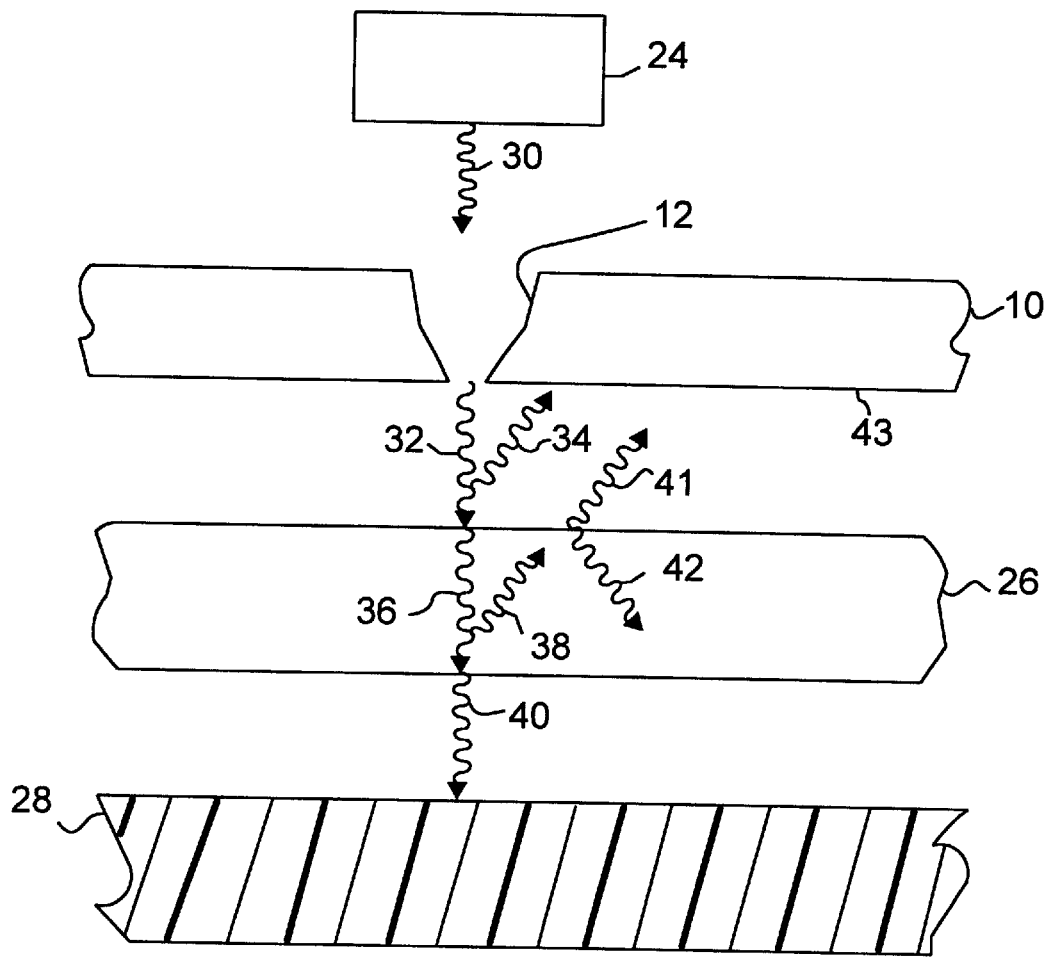
FIG. 2 is a schematic representation used to illustrate the support layer of the present invention which minimizes reflected energy towards the orifice member.

FIG. 2 is a simplified schematic representation the apparatus of the present invention for forming the tapered nozzle 12 in the nozzle member 10. The apparatus includes a radiation source 24 for providing energy to the nozzle member 10 and a support layer 26 for supporting the nozzle member 10 as the nozzle 12 is formed. The support layer 26 which is the subject of the present invention is selected to transmit radiation provided by the radiation source 24 through the support layer 26 and into an absorbing member 28. An important aspect of the support layer 26 of the present invention is that the reflected radiation from the support layer 26 toward the nozzle member 10 is minimized to prevent unintended ablation of the nozzle member 10.

The radiation source 24 provides radiation represented by beam or arrow 30 to the nozzle member 10 for forming orifice 12. The radiation source 24 in the preferred embodiment is an excimer laser. Other radiation sources having similar optical wavelengths and energy density may also be used in the ablation process. Preferably, the wavelength of such an ultraviolet light source will lie in the 150 nanometers to 400 nanometer range to allow high absorption in the orifice member 10 to be ablated. Ultraviolet light sources having longer wavelengths may also be suitable for ablating the orifice member 10.

Radiation originating from the radiation source 24 which passes through the nozzle 12 of orifice member 10 is represented by an arrow 32. This radiation represented by arrow 32 which impinges upon the surface of support layer 26 produces both reflected radiation represented by arrow 34 and a transmitted or refracted radiation represented by arrow 36. The refracted or transmitted radiation represented by arrow 36 is passed into the support layer 26. As the transmitted radiation represented by arrow 36 exits the support layer 26 both reflected radiation represented by arrow 38 and transmitted or refracted radiation represented by arrow 40 are produced. The reflected radiation represented by arrow 38 is transmitted into the support layer 26. As the reflected radiation represented by arrow 38 exits of the support layer 26 reflected radiation represented by arrow 42 and transmitted or refracted radiation represented by arrow 41 are produced.

The direction of each of arrow 32, 34, 36, 38, 40, 41 and 42 are not intended to be accurate and are shown for illustrative purposes only. In general, the reflected radiation will be at an angle that is related to an incident angle of the incident radiation. Furthermore, the transmitted radiation represented by arrows 36, 40 and 41 which are shown as being at the same angle as the corresponding incident radiation will be refracted at an angle of refraction from the corresponding incident radiation. In general, the angle of refraction is based on the index of refraction for a medium of the incident radiation and the index of refraction for a medium of the refracted radiation. The general relationship between angle of incidence in a first media and angle of refraction in a second media are related by Snell's law.

Reflected radiation represented by arrows 34 and 41 created by radiated energy passing into and out of the support layer 26 can effect the formation of the nozzle 12 in the nozzle member 10. This radiation represented by arrows 34 and 40, if of sufficient energy, can result in the ablation of a surface 43 of the nozzle member 10 adjacent the support layer 26. In addition, it is believed that energy from the reflected rays represented by arrows 34 and 41 may combine with the incident radiation represented by arrow 30 to alter the shape or taper of the nozzle member 12. Both of these effects are undesirable.

The support layer 26 of the present invention is selected to reduce or eliminate reflected energy, represented by arrows 34 and 41, due to reflected energy from the radiation source 24 entering and exiting the support layer 26. The support layer 26 of the present invention is selected such that the total energy density, or confluence, of the reflected rays 34 and 41 as well as other lower order reflections is less than the threshold of ablation for the nozzle member 10.

For example, in the case of Kapton TM the threshold of ablation is approximately 70 microjoules per square centimeter. A typical fluence or energy density to achieve useful ablation in this Kapton TM part is about 500 millijoules per square centimeter. Thus, the sum of the reflected rays 34 and 41 should be no more than 10 percent of the impinging beam. Preferably, total reflection should be 1 percent or less. Even though the reflected beam is below the ablation threshold, this reflected beam produces unwanted heating of the orifice member 10 which can cause expansion, deformation and nonuniform drying of the orifice film, each of which can lead to positioning or size errors in the laser ablated features.

The support layer 26 of the present invention should prevent the total reflected energy that is directed toward the nozzle member 10 from ablating the nozzle member 10 and altering the nozzle 12 shape or removing material from the surface 43 of the nozzle member 10. The reflected energy is preferably reduced by the use of a material for the support layer 26 that provides good transmission for the particular wavelength of the radiation source 24. Alternatively, the reflected energy can be reduced by the use of a material for the support layer 26 that provides good absorption for the particular wavelength of the radiation source 24. For the case where an absorbing material is used then cooling of the support layer 26 may be required to prevent conductive heating the nozzle member 10.

In one preferred embodiment the radiation source 24 is an Ultra Violet (UV) radiation source providing energy in having a wavelength between 200 nanometers and 400 nanameters. For the radiation source 24 operating at these wavelengths materials which provide suitable transmission of energy at these frequencies include UV grade fused silica (amorphous Si dioxide), crystal quartz (single crystal Si dioxide) or high purity fused silica such as a material marketed as Suprasil 1 TM. Other materials that have suitable transmission properties in the wavelength of interest include Magnesium Fluoride, Calcium Fluoride and Sapphire (Al Oxide). Materials having similar transmission properties to radiation at the wavelength of the radiation source 24 are also suitable.

In the preferred embodiment the support layer 26 primarily transmits energy radiated from the radiation means 24 through the support layer 26 whereupon this radiated energy is absorbed by an absorbing layer or member 28. The absorbing member 28 is made from a material that is absorbent to energy of the wavelength of the radiation source 24 such as sodalime glass. It is important that the support layer 26 transmit incident radiation through this layer instead of absorbing radiation within the support layer 26. Absorption of energy by the support layer member 26 can lead to heating which can crack the support layer 26 or produce heating of the support layer 26 which can be conducted to the orifice member 10. As discussed previously, the heating of the orifice member 10 is undesirable. Because some of the incident energy represented by arrow 32 is absorbed by the support layer 26, the support layer 26 should have good thermal shock resistance.

In the preferred embodiment, the support layer 26 is formed from fused silica. Typically, polished fused silica reflects about 4 percent of the UV radiation resulting from the radiation entering the fused silica medium as represented by the reflected ray 34. The use of fused silica as the support layer 26 produces a material which transmits energy well at excimer laser wavelengths of 193 nanometers, 248 and 308 nanometers. In addition, fused silica has good thermal shock resistance characteristics.

In an alternative embodiment the support member 26 is formed of high temperature glass, such as Pyrex TM. Pyrex TM has good thermal shock characteristics thereby being resistant to cracking and breaking as a result of localized heating. In addition, Pyrex has good thermal properties which prevents conductive heating of the orifice member 10 above a glass transition temperature for the orifice member which results in damage to the orifice member 10. It is believed that should have a high thermal diffusivity for preventing localized hot spots which if sufficiently high may cause melting of portions of the orifice member 10 adjacent the hot spots.

In the preferred embodiment the printhead is formed from Kapton TM or Upilex TM polymer tape, although the tape may be any suitable polymer film. Some such films may comprise Teflon TM, polyimide, polymethylmethacrylate, polycarbonate, polyester, polyamide, polyethyleneterephthalate or mixtures thereof.

It is noted that FIG. 2 illustrates the first order or dominant reflections which interfere with the formation of the nozzle member 12. In general there will be other reflections such as the reflections from the incident radiation represented by arrow 40 entering the absorbing member 28. These second order reflections have not been shown because they will be, in general, affect the nozzle formation less than the first order effects.

Figure 3:
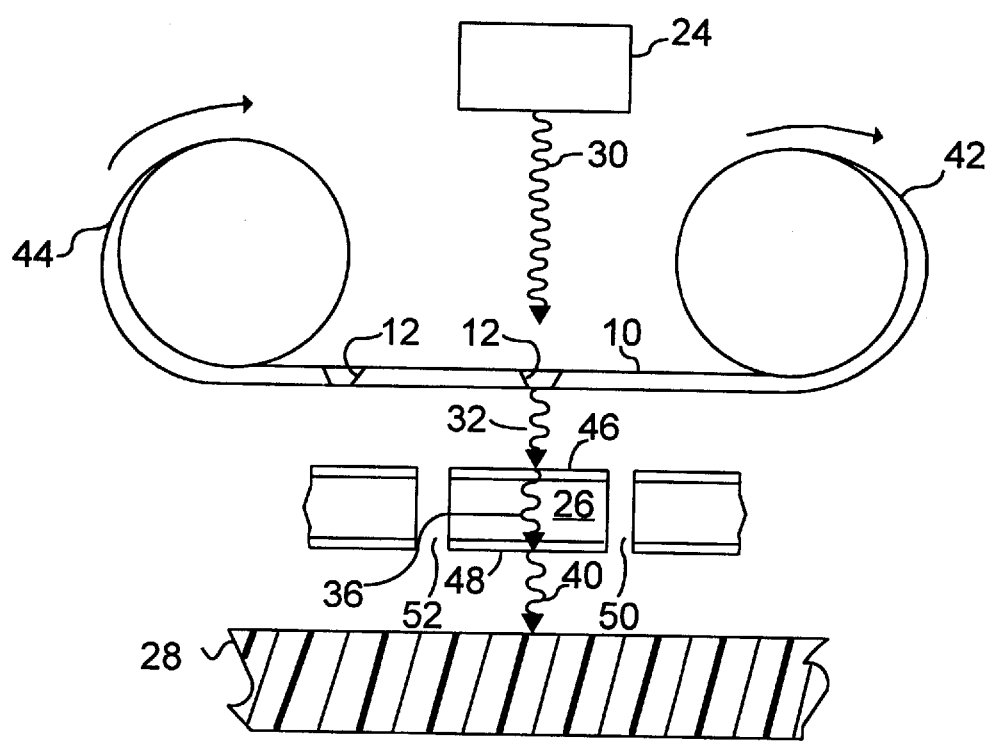
FIG. 3 is a schematic representation used to illustrate one preferred embodiment of the support layer of the present invention.

The support layer 26 of FIGS. 2 and 3 are shown as being spaced from the orifice member 10 to illustrate the reflected and refracted radiation resulting from incident radiation entering and exiting the support layer 26. In use, the orifice member 10 is supported by the support layer 26 and therefore, there is little or no spacing between the orifice member 10 and the support layer 26. In addition, the support layer is supported by the absorbing member 28 and therefore there is little or no spacing between the support layer 26 and the absorbing member 28.

FIG. 3 illustrates one preferred embodiment of the support layer 26 of the present invention which is used in conjunction with a radiation source 24 to form orifices 12 in a nozzle member 10 in a manner similar to FIG. 2. The nozzle member 10 is formed as a tape which extends between a pair of reels 42 and 44. The reels position the nozzle member beneath the radiation source 24 whereupon a selected amount of radiation as represented by arrow 30 is provided to ablate the nozzle member 10 to form the nozzle 12.

The support layer 26 which is the subject of this invention is positioned adjacent the nozzle member opposite the radiation source 24. The support layer 26 is similar to the support layer 26 of FIG. 2 except that the support layer 26 of FIG. 3 includes top and bottom coating layers 46 and 48, respectively. The top coating layer 46 is an antireflective coating which reduces reflected radiation from the support layer 26 and improves the transmission of incident radiation represented by arrow 32 into the support layer thereby increasing a refracted or transmitted radiation represented by arrow 36. Similarly, the bottom coating layer 48 is an antireflective coating which reduces the reflected radiation as the transmitted radiation represented by arrow 36 exits the support layer 26 improving the transmission or refraction of radiation out of the support layer 26 as represented by arrow 40.

The use of antireflective coatings 46 and 48 further reduces or eliminates undesired radiation resulting from reflections such as those reflections represented by arrows 34 and 41 in FIG. 2. Reducing this reflected radiation reduces the unwanted ablation of the nozzle member 10 which reduces print quality. In addition, this reduction of reflected radiation tends to reduce reflected radiation which interacts with the incident radiation represented by arrow 30 to alter the formation of the nozzle 12. This alteration of the nozzles 12 tends to be nonuniform as well as changes the shape of the nozzle from the intended shape which reduces the quality of the output image.

Antireflective coatings are one or more coatings which are selected to produce reflections which cancel by destructive interference. For example, if the reflected energy is 180 degrees out of phase and of the same intensity then exact cancellation will occur thereby eliminating or canceling the reflected energy. These antireflective coatings have a maximum reflectance that is less than 1 percent of the incident energy and typically on the order of 0.25 percent of the incident energy. Antireflective coatings techniques are known and often used in optical lens coatings.

Vacuum holes 50 and 52 are provided extending through the support layer 26 for maintaining the nozzle member 12 in contact with the top coating layer 46 of the support layer 26. By maintaining the nozzle member 12 in contact with the top coating layer 46 a constant spacing between the energization source 24 and nozzle member 10 is maintained reducing variation in nozzle formation due to spacing variation between energization source 24 and nozzle member 10. By eliminating or reducing this spacing variation nozzles formed are more accurate and are more consistent from nozzle to nozzle.

Because the nozzle member 10 is held in contact with the support layer 26 it is important that the support layer 26 have a smooth surface so that the nozzle member 10 is not damaged as it is stepped passed the energization source 24 by the pair of reels 42 and 44. The use of a smooth surface on the support layer 26 has the additional benefit that a smooth surface tends to help minimize spacing variation between the radiation source 24 and the nozzle member 10. Because the nozzle member 10 is stepped across the support layer 26 it is important that the support layer 26 be abrasive resistant so that the support layer does not need frequent maintenance or replacement. The antireflective coating 46 meets all these requirements. This coating 46 tends to be smooth, abrasive resistant and minimizes reflected radiation and is therefore well suited to this application.

The support layer 26 of the present invention reduces the reflected energy directed toward the nozzle member 10 which allows for the formation of more uniform and nozzles having fewer defects. Uniform nozzle members 10 having little or no defects form high quality images on print media. In addition, the support layer prevents debris that is partially attached to the nozzle member 10 from falling away until it is fully ablated thereby eliminating the "trapdoor" problem.

What is claimed is:

1. An ink-jet printhead nozzle ablation apparatus, the apparatus comprising:

a radiation source to provide radiation of only sufficient energy density to form nozzles of a selected shape in a nozzle member, wherein the nozzle member is a thin member having a first surface and a second surface opposite the first surface, the radiation from the radiation source impinging on the first surface of the nozzle member, and wherein the selected shape includes a tapered sidewall between a first opening formed in the first surface and a second opening formed in the second surface, the first opening larger than the second opening; and a support layer positioned proximate the second surface of the nozzle member opposite the radiation source, the support layer adapted to limit reflection of radiation from the support layer to less than an ablation threshold to prevent unwanted ablation of the second surface of the nozzle member proximate the second opening.

2. The apparatus of claim 1 wherein the support layer is formed from a material that is selected to have a thermal diffusivity that is sufficient to limit conductive heating of the nozzle member to less than a glass transition temperature of the nozzle member.

3. The apparatus of claim 1 wherein the radiation source produces light having a selected wavelength and the support layer is formed from a material having an ability to transmit radiation having the selected wavelength.

4. The apparatus of claim 1 wherein the support layer is made from a material that reflects less than 10 percent of the incident energy.

5. The apparatus of claim 1 wherein the support layer is formed of a material having a coefficient of refraction that is selected to limit reflected radiation from the support layer to prevent alteration of the nozzle member from the selected shape.

6. The apparatus of claim 1 further including a backing layer positioned adjacent the support layer opposite the radiation source, the backing layer formed from a material selected to absorb radiation emitted by the radiation source.

7. The apparatus of claim 1 wherein the support layer includes a coating layer to reduce reflected radiation from the support layer toward the nozzle member.

8. The apparatus of claim 5 wherein the coating layer is an antireflective coating layer.

9. The apparatus of claim 1 wherein the radiation source is an excimer laser.

10. The apparatus of claim 1 wherein the support layer is made from fused silica.

11. The apparatus of claim 1 wherein the support layer is positioned directly adjacent the nozzle member.

12. A method for forming nozzles in a nozzle member for a printhead, the nozzle member a flat thin member having first and second opposed surfaces, the method comprising:

supporting the nozzle member with a support layer, the support layer positioned with the nozzle member between a radiation source and the support layer such that the first surface of the nozzle member faces the radiation source and the second surface is proximate the support layer;

radiating the nozzle member with only sufficient energy density to form nozzles of a selected shape, the nozzles defined by a first opening formed in the first surface, a second opening formed in the second surface, and a tapered sidewall between the first opening and the second opening, wherein the first opening is larger than the second opening; and directing radiation through the support layer while limiting radiation reflection from the support layer to the second surface of the nozzle member to less than an ablation threshold to prevent unwanted ablation of the second surface of the nozzle member proximate the second opening.

13. An apparatus for forming nozzles in a nozzle member for a printhead, the apparatus comprising:

a radiation source to provide only sufficient energy density to form nozzles of a selected shape in the nozzle member, the nozzle member a thin member having a second surface opposite the first surface, and wherein the selected shape includes a tapered sidewall between a first opening formed in the first surface and a second opening formed in the second surface, the first opening larger than the second opening, the radiation source positioned such that the radiation impinges on the first surface of the nozzle member;

a base layer; and an intermediate antireflective layer positioned between the base layer and a second surface of the nozzle member, the intermediate antireflective layer formed of a material and thickness in the direction of the radiation source to produce reflections which cancel by destructive interference such that the intermediate layer transmits radiation therethrough while canceling reflected radiation such that reflected radiation from the base layer and the intermediate layer is not sufficient to alter the selected shape of the nozzle member.

14. An ink-jet nozzle ablation apparatus of claim 1 wherein the tapered sidewall has a taper in the range from 5 degrees to 30 degrees relative to an axis of the orifice.

* * * * *

UNITED STATES PATENT AND TRADEMARK OFFICE
CERTIFICATE OF CORRECTION

PATENT NO. : 5,855,835
DATED : January 5, 1999
INVENTOR(S) : Gordon, et al.

It is certified that error appears in the above-identified patent and that said Letters Patent is hereby corrected as shown below:

Title page,
After the inventor section, please insert the following:
-- [73] Assignee: Hewlett-Packard Company, Palo Alto, Calif. --

Signed and Sealed this

Twenty-third Day of October, 2001

*Attest:*

*Nicholas P. Godici*

NICHOLAS P. GODICI
*Attesting Officer*  *Acting Director of the United States Patent and Trademark Office*